March 12, 1963   B. V. FOWLER   3,081,428
NUCLEAR INDUCTION FLUXMETER AND MAGNET CONTROL APPARATUS
Filed Dec. 5, 1960
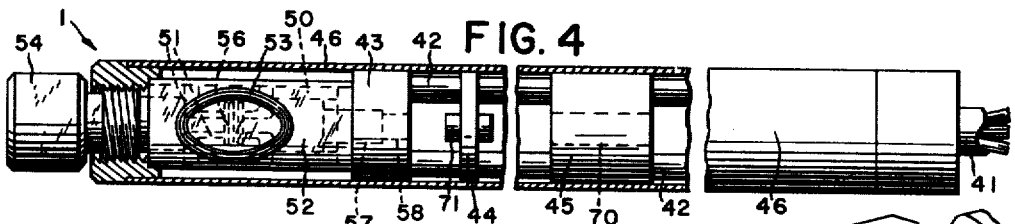
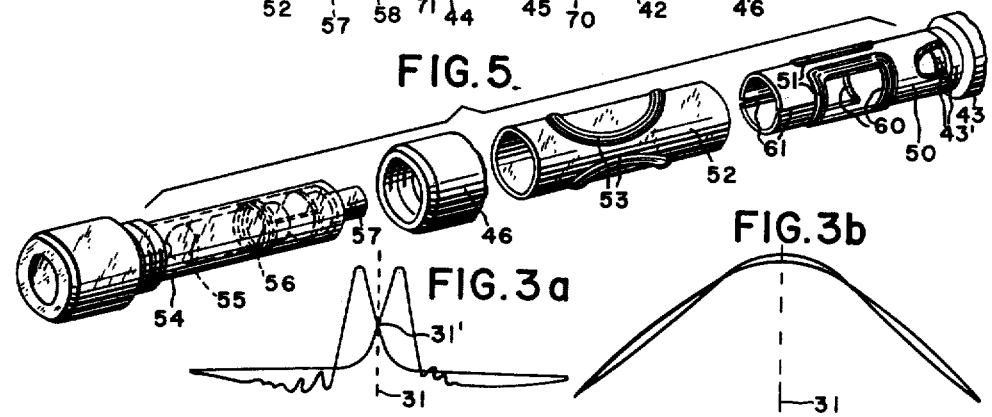
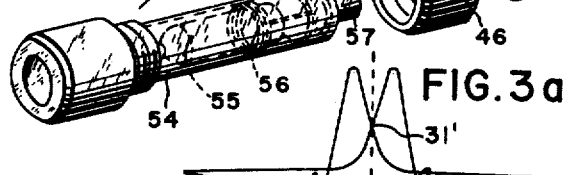
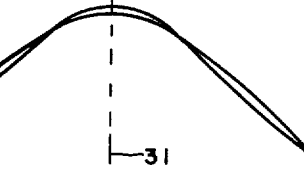
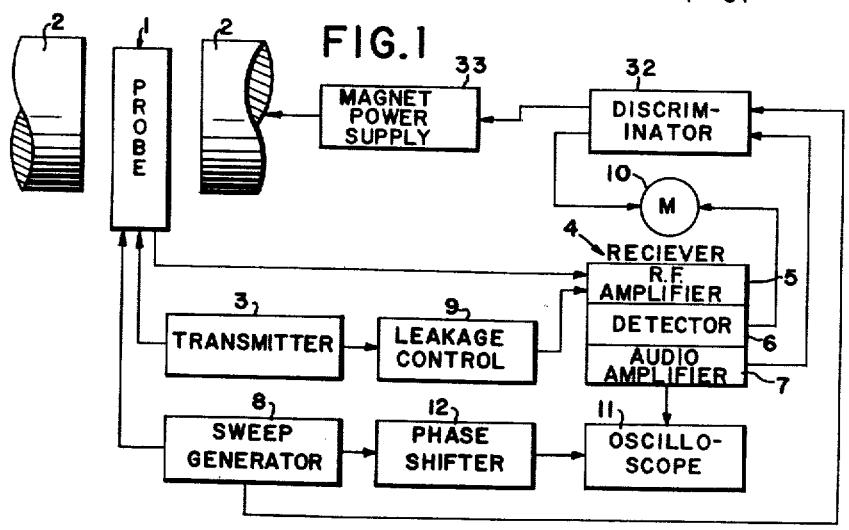
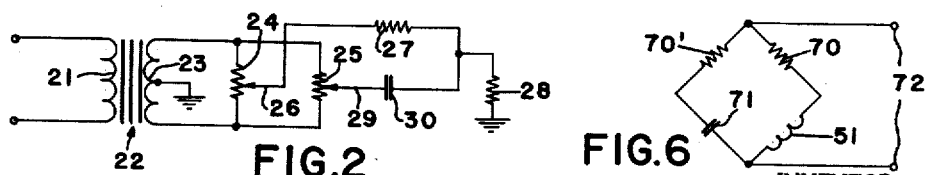
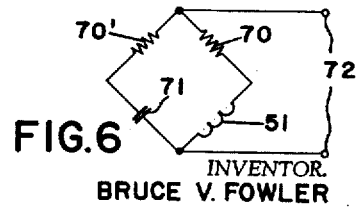
INVENTOR.
BRUCE V. FOWLER
BY
ATTORNEY

# United States Patent Office 3,081,428
Patented Mar. 12, 1963

3,081,428
NUCLEAR INDUCTION FLUXMETER AND
MAGNET CONTROL APPARATUS
Bruce V. Fowler, Los Altos, Calif., assignor to Varian
Associates, Palo Alto, Calif., a corporation of California
Filed Dec. 5, 1960, Ser. No. 73,676
11 Claims. (Cl. 324—0.5)

The present invention relates in general to gyromagnetic resonance apparatus, and more particularly to novel apparatus useful in the measurement and control of magnetic fields by nuclear magnetic induction.

The magnetic sensing element of a nuclear induction instrument consists of a probe structure supporting three mutually perpendicular sets of coils disposed about a sample of matter possessing a characteristic gyromagnetic constant $\gamma$. One set of coils, the axis of which is substantially perpendicular to an external polarizing unidirectional magnetic field of intensity H, is energized by a radio frequency transmitter. When the transmitter frequency is equal to the value $$f_0 = \frac{\gamma}{2\pi} H$$

the magnetic moment of the sample undergoes a magnetic resonance precession about the unidirectional magnetic field thereby inducing a signal in the coil which has an axis substantially perpendicular to both the transmitter coil axis and the unidirectional magnetic field. The third set of coils, the axis of which is substantially parallel to the unidirectional magnetic field, is energized to establish an audio frequency magnetic intensity sweep for facilitating detection of the nuclear induction signal. Alternatively, the sweep coils may be omitted, and the transmitter frequency modulated at an audio rate.

In the embodiment described herein, the gyromagnetic constant $\gamma$ of the sample is precisely known, and the transmitter frequency is adjusted to the value $f_0$ at which a resonance signal is produced. The frequency $f_0$ may then be read as a direction fluxmeter indication of the magnetic field intensity H in view of the known proportionality factor $$2\frac{\pi}{\gamma}$$

For example, this factor is 234.9 gauss per megacycle with a proton sample, and 1529.9 gauss per megacycle with a deuteron sample. It should be understood however that any one of the parameters H, $f_0$ or $\gamma$ may be determined when the other two are known, so that the present invention is also applicable, for example, to isotope identification.

Prior nuclear induction instruments are subject to several significant limitations, particularly in magnetic field measuring applications. For example, the probe structure incorporates bulky and complicated devices for adjusting the magnetic leakage between the transmitter and receiver coils, and also for providing electrostatic shielding between these coils. Such probe structures cannot be used in narrow magnet gaps or for very detailed exploration, and, in any event, require repeated difficult adjustments over any substantial measuring range. As a further example, it is to be noted that prior probes are usually designed for use with short, fixed length R.F. leads and cannot be effectively used for remote measurements over long cables (for example, up to 50 feet).

It is the principal object of the present invention to overcome these and other limitations by providing a rugged and compact nuclear induction instrument, particularly for the rapid and convenient measurement and control of the field intensity of magnet gaps.

One feature of the present invention is the provision of a simple, compact nuclear induction probe structure.

Another feature of the present invention is the provision of a simple, wide range, signal mode selector.

A further feature of the present invention is the provision of a transmitter coil bridge circuit which establishes a matched radio frequency cable termination over a substantial frequency range.

Still another feature of the present invention is the provision of a simple circuit for providing a flexible and informative oscilloscope display.

These and other features and advantages will become apparent upon a perusal of the drawings wherein:

FIG. 1 is a block diagram of a nuclear induction fluxmeter and magnet control instrument in accordance with the present invention, FIG. 2 is a detailed schematic diagram of the leakage control unit of FIG. 1, FIGS. 3a and 3b are typical displays seen on the oscilloscope of FIG. 1, FIG. 4 is an elevational view, partly in cross-section, of a nuclear induction probe structure in accordance with the present invention, FIG. 5 is an exploded view, partly broken away, of the transmitter, receiver and sweep coil sub-assemblies in the probe of FIG. 4, and FIG. 6 is a bridge circuit for the transmitter coil in the probe of FIG. 4.

Referring to the block diagram of FIG. 1, a nuclear induction probe 1 is positioned in the gap between the pole pieces 2 of an electromagnet. The transmitter 3 supplies R.F. power at the nuclear magnetic resonance frequency of a gyromagnetic sample contained in the probe 1, and the induction signal of the sample is fed to a receiver 4 comprising, in successive stages, an R.F. amplifier 5, an audio detector 6 and an audio amplifier 7. The polarizing unidirectional field intensity is modulated at an audio rate (for example, the power line frequency) by sinusoidal sweep generator 8 thereby introducing an audio modulation on the nuclear resonance signal which is detected and amplified by receiver stages 6 and 7.

The nuclear induction signal may be resolved into a component which is in-phase with the transmitter voltage and a component which is out-of-phase or in quadrature, the former component being known as the dispersion or U-mode, and the latter component as the absorption or V-mode. A portion of the transmitter signal is coupled through leakage control unit 9 directly to the R.F. amplifier stage 5 of receiver 4 and is thereby superimposed on the nuclear induction signal from probe 1. The leakage signal level, as monitored by the detector current meter 10, is made sufficiently large to overcome the contact potential of the detector and enables homodyne detection of whichever nuclear induction signal mode is in-phase with the leakage signal. Thus, a desired mode is selected by introducing a leakage signal in-phase therewith.

Since the cable lead from the probe to the receiver may be several wavelengths long and also of varying length for flexible remote control operation, there may be a large variation in the phase angle between the received induction signal and the leakage signal. To enable signal mode selection in view of this phase variation, the leakage control unit 9 is provided with a simple but effective circuit shown in FIG. 2 for introducing a leakage signal of adjustable amplitude and phase throughout 360 electrical degrees. A portion of the transmitter power is applied to the primary winding 21 of transformer 22. The secondary winding 23 has a grounded center tap and so applies balanced voltages which are in push-pull or phase opposition to opposite terminals of parallel potentiometer resistances 24 and 25. Contact arm 26 of potentiometer 24 is connected to the output load 28 through series resistor 27, and contact arm 29 of potentiometer 25 is connected to the output load 28 through series capacitor 30. The impedance of elements 27 and 30 are preferably chosen to be approximately equal at the geometric mean frequency of the transmitter 3. Movement of contact arm 26 from the center tap position of potentiometer 24 developes a voltage of desired magnitude and polarity across load 28 which is in-phase with the primary transmitter voltage, and similarly movement of contact arm 29 developes a desired out-of-phase or quadrature voltage across the load 28. Thus, manipulation of the two potentiometer controls 26 and 29 enables the development of a transmitter leakage signal of the desired amplitude and phase with respect to the receiver coil voltage of probe 1.

To measure the field intensity in the gap between the magnet pole pieces 2, the frequency of transmitter 3 is varied until a signal is observed on the oscilloscope 11, the horizontal deflection plates of which are coupled to the sweep generator 8 through phase shift network 12, and the vertical plates of which are coupled to audio amplifier 7. Since the magnetic field is swept through the resonance value twice for every cycle of the sweep generator 8, the oscilloscipe trace will appear as two mutually inverted pulses as shown in FIG. 3a. For convenient location of the exact center frequency of resonance, the leakage control unit 9 is adjusted until a substantially pure V-mode is obtained in which the two pulses are horizontally aligned. Then the spacing between the two pulses is varied by adjusting sweep generator phase shift control 12 so as to present a clearly recognizable intersection point 31' between overlapping portions of the pulses, the center of resonance being determined when the intersection point 31' falls on the center line 31 of the display screen. The frequency at which the display of FIG. 3a is seen is thus a direct measure of the magnetic field intensity. If, instead of measuring the intensity of a fixed magnetic field, it is desired to adjust the field of the magnet to a certain value, the transmitter 3 is set at the frequency corresponding to this value and the magnet coil current is varied until a signal of the type shown in FIG. 3a is displayed. It should be noted that the placing of phase shift circuit 12 in series with the high impedance oscilloscope circuit advantageously permits the use of small capacitors in circuit 12 at the low sweep generator frequency.

When it is desired to automatically maintain the magnet field constant, for example, in the event of line voltage fluctuations or thermal variations, a discriminator circuit 32 is included. The phase shifter 12 is adjusted until the two oscilloscope pulses coincide, and then the amplitude of the sweep generator 8 is reduced until the trace is approximately equal to the line width of the sample as shown in FIG. 3b. Under these conditions, any tendency of the magnet field intensity to drift from the resonance value corresponding to the frequency of transmitter 3 will introduce a component in the audio amplifier input to discriminator 32 which is at the frequency of the sweep generator input. Thus, the output of the discriminator 32 applies a signal of the proper magnitude and polarity for adjusting the magnet power supply 33 so that the gap field is maintained at the resonance value. The discriminator 32 is also coupled to the ammeter 10 to provide a convenient discriminator output monitor.

Referring now to FIG. 4, the cable 41 containing the transmitter, receiver and sweep generator leads is terminated in a probe structure 1 comprising a brass frame assembly 42 having a plurality of disc-shaped spacers 43, 44, 45 over which is placed a tubular aluminum cover 43, 44, 45 over which is placed a tubular aluminum cover 46.

As best seen in the exploded sub-assembly view of FIG. 5, spacer 43 has a pair of forwardly extending step portions 43' over which are snugly press-fitted and cemented a tubular aluminum form 50 having a pair of insulated transmitter coils 51 cemented thereto, and a concentrically surrounding tubular dielectric form 52 to which is cemented a pair of sweep coils 53 the axis of which is perpendicular to the axis of the coils 51. The front end of housing 46 is internally threaded to enable the variable insertion of an interchangeable dielectric sample holder 54 inside of which is positioned a glass ampoule 55 containing the gyromagnetic sample. A coaxial receiver coil 56 cemented between ampoule 55 and the housing of holder 56 so as to be tightly coupled to the gyromagnetic sample, is connected to the female member 57 of a coaxial connector. As seen in FIG. 4, the male connector member 58 is secured in the spacer 43 thereby enabling connection of the receiver coil 56 to the receiver cable lead and also providing a bearing for the rotation of the sample holder 54. Rotation of the sample holder 54 adjusts the leakage between the transmitter coils 51 and the receiver coil 56 to a value (indicated by the meter 10) which is suitable for operation over the entire measuring range, additional adjustments in leakage being made, when necessary, through the leakage control 9 mounted on the instrument panel.

Referring now in greater detail to the transmitter coil form 50, the coils 51 are wound around the edges of opposed cutout window portions 60 which enable the magnetic field set up by coils to thread the gyromagnetic sample. Small slots 61 cut in form 50 from the front edge thereof to the windows 60 prevent the formation of surface eddy current loops which would cancel the magnetic field of the transmitter coils 51. However, the extensive metallic surface of the form 50 serves as a very effective electrostatic shield between the transmitter coils and receiver coil 56. Since the rigid and self-supporting thin tube 50 serves as both a transmitter coil form and an electrostatic shield, a very compact probe structure enabling efficient utilization of transmitter power is provided.

In practice, the transmitter frequency will vary over a substantial range. For example, in a fluxmeter for measuring a field range from 1 to 52 kilogauss with interchangeable proton (for example, $H_2O$) and deuteron (for example, $D_2O$) samples, the transmitter frequency varies from 4.25 to 34.0 megacycles. To enable operation with long cables of varying length, the transmitter transmission line lead is terminated in the bridge circuit shown in FIG. 6. One branch of the bridge contains a resistor arm 70 in series with the transmitter coil arm 51, and the other branch of the bridge contains a resistor arm 70' in series with a capacitor arm 71. The impedance of elements 51, 70, 70' and 71 are all selected to be equal to the characteristic impedance of the transmission line at the geometric mean frequency of the measuring range. Thus, changes in the inductive reactance of the coil 51 with frequency are offset by changes in the capacitive reactance of the capacitor 71 thereby maintaining the impendance across diagonal input terminals 72 at the characteristic impedance value. Also, it should be noted that the current in the transmitter coil 51 increases with decreasing frequency to offset the normal loss in the signal-to-noise ratio of the nuclear induction signal at lower field intensities. As seen in FIG. 4, the capacitor 71 is conveniently mounted on spacer 44 and the resistors 70 and 70' are inserted within the large solid spacer 45 to facilitate heat dissipation.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyromagnetic induction probe, the combination comprising: a tubular metallic transmitter coil form having a cut-out window portion through the surface thereof, and a transmitter coil wound around the edge of said window portion, said coil form having a slot extending from one edge thereof to said window portion whereby said transmitter coil may produce a magnetic field in the interior of said form while being electrostatically shielded therefrom.

2. In a gyromagnetic induction probe, the combination comprising: a tubular metallic transmitter coil form having an opposed pair of cut-out window portions through the surface thereof, a pair of opposed transmitter coils wound around the edges of said window portions, a receiver coil coaxially disposed within said transmitter coil form, said coil form having a pair of slots extending from one edge thereof to said window portions whereby said transmitter coil may produce a magnetic field in the interior of said receiver coil while being electrostatically shielded therefrom.

3. The combination of claim 2 further comprising a gyromagnetic sample holder adapted for variable insertion through one end of said transmitter coil form into the interior thereof.

4. The combination of claim 3 further comprising means for rigidly supporting said transmitter coil form at the rear end thereof.

5. The combination of claim 4 wherein said receiver coil is fixedly mounted on said sample holder and connected to one member of a coaxial connector also mounted on the rear end of said sample holder, said supporting means having the mating member of said connector mounted thereon whereby said connector members make electrical contact and also provide a bearing surface for rotation of said sample holder.

6. The combination of claim 5 further comprising a second tubular coil form having a pair of opposed sweep coils wound on the surface thereof, said second coil form being supported on said supporting means in surrounding coaxial relation with respect to said transmitter coil form, the axis of said sweep coils being substantially perpendicular to the axis of said transmitter coil.

7. In a gyromagnetic induction apparatus, the combination comprising: a transmitter for supplying magnetic resonance frequency energy to a gyromagnetic sample; a receiver for amplifying and detecting the induction signal produced by said sample; and means coupling a portion of said transmitter power directly to said receiver, said coupling means comprising a transformer having a primary winding energized by said transmitter and a secondary winding with a grounded center tap whereby the terminals of said secondary winding are energized in phase opposition, a pair of potentiometers connected in parallel across said secondary winding, the contact arm of one of said potentiometers being connected in series with a resistive impedance and the contact arm of the other potentiometer being connected in series with a reactive impedance, and means for combining the outputs of said potentiometers whereby a signal variable in amplitude and phase throughout 360 electrical degrees is coupled to said receiver.

8. In a gyromagnetic resonance apparatus, the combination comprising: a radio frequency coil connected in one arm of a two-terminal bridge circuit for terminating a transmission line, a transmission line coupled to the diagonal terminals of said bridge circuit for supplying magnetic resonance frequency energy to said coil over a substantial frequency range, two branches of said bridge circuit being connected in parallel across said transmission line, a first resistance connected in the arm of said bridge in the same branch as said radio frequency coil, a second resistance and a capacitance connected, respectively, in the two arms of the opposite branch of said bridge, the impedance of said resistances, said coil and said capacitor all being substantially equal to the characteristics impedance of said transmission line at the geometric mean frequency of said frequency range whereby said bridge circuit is matched to said transmission line over said frequency range.

9. The combination of claim 8 wherein said resistances, said coil and said capacitor are supported by a metallic frame assembly, said resistances being inserted within said frame assembly to facilitate heat dissipation.

10. In a gyromagnetic induction fluxmeter, the combination comprising: a probe structure adapted to be positioned in a unidirectional polarizing magnetic field and comprising a tubular metallic transmitter coil form having an opposed pair of cut-out window portions through the surface thereof, a pair of opposed transmitter coils wound around the edges of said window portions, a gyromagnetic sample holder adapted for variable insertion through one end of said transmitter coil form into the interior thereof, a receiver coil fixedly mounted on said sample holder and closely coupled to a gyromagnetic sample therein, said coil form having a pair of slots extending from one edge thereof to said window portions whereby said transmitter coil may produce a magnetic field in the interior of said receiver coil while being electrostatically shielded therefrom; a transmitter supplying magnetic resonance frequency energy to said gyromagnetic sample over a substantial frequency range, said transmitter coil being connected in a bridge circuit which is matched to said transmission line over said frequency range; a receiver for amplifying and detecting the induction signal induced by said sample in said receiver coil; means for sweeping said gyromagnetic sample in and out of resonance twice during each sweep cycle; an oscilloscope coupled to said receiver and said sweep means whereby mutually inverted signal pulse traces are displayed on the screen of said oscilloscope; means coupling a portion of said transmitter power with variable amplitude and phase throughout 360 electrical degrees directly to said receiver for selecting the mode of said induction signal, said mode selection being monitored by the relative alignment of the signal pulse traces displayed on said oscilloscope screen; and a phase shift network interposed between said sweep means and said oscilloscope for varying the spacing between said pulse traces whereby the center frequency of resonance corresponding to the polarizing unidirectional magnetic field may be readily identified and the amplitude of said sweep means determined.

11. The combination of claim 10 further including a discriminator circuit energized by said receiver and said sweep means, the output of said discriminator circuit producing a signal of proper magnitude and polarity for controlling the power supply of a magnet which produces said polarizing unidirectional magnetic field so that said magnet is stabilized at a fixed value of field intensity corresponding to a fixed transmitter frequency setting.

References Cited in the file of this patent

Thomas: Journal of Research of the National Bureau of Standards, vol. 44, research paper No. RP2104, June 1950 (pp. 569 to 573 principally relied on).

Mitchell et al.: The Review of Scientific Instruments, vol. 28, No. 8, August 1957, pp. 624 to 628 incl.

Redfield: The Review of Scientific Instruments, vol. 27, No. 4, April 1956, pp. 230 to 232 incl.

Bloembergen et al.: Physical Review, vol. 73, No. 7, Apr. 1, 1958, pp. 683 to 688 principally relied upon.

Andrew: Nuclear Magnetic Resonance, published by University Press, Cambridge, 1955, pp. 46–49 principally relied on.

UNITED STATES PATENT OFFICE
CERTIFICATE OF CORRECTION

Patent No. 3,081,428            March 12, 1963

Bruce V. Fowler

It is hereby certified that error appears in the above numbered patent requiring correction and that the said Letters Patent should read as corrected below.

Column 1, line 41, for "direction" read -- direct --; column 3, line 26, for "oscilloscipe" read -- oscilloscope --; line 74, strike out "44, 45 over which is placed a tubular aluminum cover 43,"; column 5, line 9, for "thereot" read -- thereof --; column 6, line 3, for "impedance" read -- impedances --.

Signed and sealed this 22nd day of October 1963.

(SEAL)
Attest:

ERNEST W. SWIDER
Attesting Officer

EDWIN L. REYNOLDS
Acting Commissioner of Patents